US012350591B2

(12) United States Patent
Sanchez et al.

(10) Patent No.: US 12,350,591 B2
(45) Date of Patent: *Jul. 8, 2025

(54) SYSTEMS AND METHODS FOR GENERATING VIRTUAL CHARACTERS FOR A GAME

(71) Applicant: QUANATA, LLC, San Francisco, CA (US)

(72) Inventors: Kenneth Jason Sanchez, San Francisco, CA (US); Micah Wind Russo, Oakland, CA (US)

(73) Assignee: QUANATA, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,885

(22) Filed: Apr. 29, 2024

(65) Prior Publication Data

US 2024/0278132 A1 Aug. 22, 2024

Related U.S. Application Data

(63) Continuation of application No. 17/404,139, filed on Aug. 17, 2021, now Pat. No. 11,969,653.

(51) Int. Cl.
*A63F 13/65* (2014.01)
*A63F 13/58* (2014.01)
*A63F 13/803* (2014.01)

(52) U.S. Cl.
CPC .............. *A63F 13/58* (2014.09); *A63F 13/65* (2014.09); *A63F 13/803* (2014.09)

(58) Field of Classification Search
None
See application file for complete search history.

(56) References Cited

U.S. PATENT DOCUMENTS 6,726,567 B1 4/2004 Khosla
7,278,920 B1 10/2007 Klamer et al.
(Continued)

FOREIGN PATENT DOCUMENTS

CN 105718065 6/2016
CN 107543554 1/2018
(Continued)

OTHER PUBLICATIONS

Quinn, Nathan, "F1 2021 Driver Ratings Unveiled as Verstappen Equals Hamilton," Jul. 8, 2021, available at https://the-race.com/gaming/f1-2021-driver-ratings-unveiled-as-verstappen-equals-hamilton/ 2021.

(Continued)

*Primary Examiner* — Jay Trent Liddle
(74) *Attorney, Agent, or Firm* — BRYAN CAVE LEIGHTON PAISNER LLP

(57) ABSTRACT

A computer-implemented method for generating one or more virtual characters, the computer-implemented method including determining, by a computing device, one or more first real-world driving characteristics comprising a first real-world focus skill based at least in part upon first real-world telematics data; determining, by the computing device, one or more first virtual driving characteristics comprising a first virtual focus skill based at least in part upon the one or more first real-world driving characteristics; generating, by the computing device, a first virtual character; presenting, by the computing device, the first virtual character in a virtual game; generating, by the computing device, a second virtual character associated with one or more second virtual driving characteristics; and presenting, by the computing device, the second virtual character in a virtual game. Other embodiments are described.

20 Claims, 5 Drawing Sheets

(56) References Cited

U.S. PATENT DOCUMENTS

| | | |
|---|---|---|
| 8,645,029 B2 | 2/2014 | Kim et al. |
| 8,799,035 B2 | 8/2014 | Coleman et al. |
| 9,140,567 B2 | 9/2015 | Fryer et al. |
| 9,327,189 B2 | 5/2016 | Bavitz et al. |
| 9,352,216 B2 | 5/2016 | Mullen |
| 9,373,203 B1 | 6/2016 | Fields et al. |
| 9,381,426 B1 | 7/2016 | Hughes et al. |
| 9,473,893 B2 | 10/2016 | Kuramura et al. |
| 9,478,150 B1 | 10/2016 | Fields et al. |
| 9,498,704 B1 | 11/2016 | Cohen et al. |
| 9,586,591 B1 | 3/2017 | Fields et al. |
| 9,643,089 B2 | 5/2017 | Ishikawa et al. |
| 9,691,298 B1 | 6/2017 | Hsu-Hoffman et al. |
| 9,754,425 B1 | 9/2017 | Iqbal et al. |
| 9,786,170 B2 | 10/2017 | Roy et al. |
| 9,858,832 B1 | 1/2018 | Hsu-Hoffman et al. |
| 9,892,573 B1 | 2/2018 | Hsu-hoffman et al. |
| 9,916,693 B1 | 3/2018 | Carr et al. |
| 9,943,754 B2 | 4/2018 | Prasad et al. |
| 10,013,883 B2 | 7/2018 | Farnham, IV et al. |
| 10,055,794 B1 | 8/2018 | Konrardy et al. |
| 10,086,287 B2 | 10/2018 | Krietzman et al. |
| 10,127,570 B1 | 11/2018 | Cote et al. |
| 10,181,238 B2 | 1/2019 | Hate |
| 10,262,375 B1 | 4/2019 | Howard |
| 10,282,786 B1 | 5/2019 | Osborne et al. |
| 10,282,911 B2 | 5/2019 | Carr et al. |
| 10,360,576 B1 | 7/2019 | Hsu-Hoffman |
| 10,369,472 B1 | 8/2019 | Mattar et al. |
| 10,384,130 B2 | 8/2019 | Parisi |
| 10,403,043 B2 | 9/2019 | Kaufman et al. |
| 10,430,745 B2 | 10/2019 | Rani et al. |
| 10,445,758 B1 | 10/2019 | Bryer et al. |
| 10,521,983 B1 | 12/2019 | Hsu-Hoffman et al. |
| 10,557,715 B2 | 2/2020 | Caldas et al. |
| 10,603,591 B1 | 3/2020 | Navulur |
| 10,617,938 B2 | 4/2020 | Chen et al. |
| 10,681,181 B2 | 6/2020 | Hamill |
| 10,703,378 B1 | 7/2020 | Russo et al. |
| 10,713,543 B1 | 7/2020 | Skuin et al. |
| 10,723,312 B1 | 7/2020 | Potter et al. |
| 10,737,184 B2 | 8/2020 | Baszucki |
| 10,775,179 B1 | 9/2020 | Hayward |
| 10,782,699 B2 | 9/2020 | Tao et al. |
| 10,788,332 B2 | 9/2020 | Deluca et al. |
| 10,831,207 B1 | 11/2020 | Leung et al. |
| 10,832,593 B1 | 11/2020 | Dahl et al. |
| 10,885,539 B1 | 1/2021 | Purgatorio et al. |
| 10,885,592 B2 | 1/2021 | Hsu-Hoffman et al. |
| 10,915,964 B1 | 2/2021 | Purgatorio et al. |
| 10,916,075 B1 | 2/2021 | Webster et al. |
| 11,037,382 B2 | 6/2021 | Lei et al. |
| 11,504,622 B1 | 11/2022 | Sanchez et al. |
| 2001/0006908 A1 | 7/2001 | Fujioka et al. |
| 2002/0028704 A1 | 3/2002 | Bloomfield et al. |
| 2002/0070916 A1 | 6/2002 | Noro et al. |
| 2002/0075286 A1 | 6/2002 | Yonezawa et al. |
| 2002/0082068 A1 | 6/2002 | Singhal |
| 2002/0082082 A1 | 6/2002 | Stamper et al. |
| 2002/0090985 A1 | 7/2002 | Tochner et al. |
| 2002/0178033 A1 | 11/2002 | Yoshioka et al. |
| 2002/0198055 A1 | 12/2002 | Bull et al. |
| 2003/0062675 A1 | 4/2003 | Noro et al. |
| 2003/0144047 A1 | 7/2003 | Sprogis |
| 2003/0224855 A1 | 12/2003 | Cunningham |
| 2004/0005927 A1 | 1/2004 | Bonilla et al. |
| 2004/0046655 A1 | 3/2004 | Benes et al. |
| 2004/0058732 A1 | 3/2004 | Piccionelli |
| 2004/0224740 A1 | 11/2004 | Ball et al. |
| 2004/0248653 A1 | 12/2004 | Barros et al. |
| 2004/0259059 A1 | 12/2004 | Aoki et al. |
| 2005/0009608 A1 | 1/2005 | Robarts et al. |
| 2005/0049022 A1 | 3/2005 | Mullen |
| 2005/0114102 A1 | 5/2005 | Gilbert et al. |
| 2006/0105838 A1 | 5/2006 | Mullen |
| 2006/0154710 A1 | 7/2006 | Serafat |
| 2006/0257832 A1 | 11/2006 | Atkins et al. |
| 2006/0258420 A1 | 11/2006 | Mullen |
| 2007/0257804 A1 | 11/2007 | Gunderson et al. |
| 2007/0281765 A1 | 12/2007 | Mullen |
| 2007/0281766 A1 | 12/2007 | Mullen |
| 2007/0296723 A1 | 12/2007 | Williams |
| 2008/0015018 A1 | 1/2008 | Mullen |
| 2008/0015024 A1 | 1/2008 | Mullen |
| 2008/0081694 A1 | 4/2008 | Hong et al. |
| 2008/0280684 A1 | 11/2008 | Mcbride et al. |
| 2008/0309675 A1 | 12/2008 | Fleury et al. |
| 2009/0005140 A1 | 1/2009 | Rose et al. |
| 2009/0076784 A1 | 3/2009 | Ong et al. |
| 2010/0205012 A1 | 8/2010 | Mcclellan |
| 2010/0227688 A1 | 9/2010 | Lee et al. |
| 2010/0271367 A1 | 10/2010 | Vaden et al. |
| 2011/0090075 A1 | 4/2011 | Armitage et al. |
| 2011/0212766 A1 | 9/2011 | Bowers et al. |
| 2011/0319148 A1 | 12/2011 | Kinnebrew et al. |
| 2012/0052953 A1 | 3/2012 | Annambhotla et al. |
| 2012/0069131 A1 | 3/2012 | Abelow |
| 2012/0072241 A1 | 3/2012 | Krause et al. |
| 2012/0142429 A1 | 6/2012 | Muller |
| 2012/0185282 A1 | 7/2012 | Gore et al. |
| 2013/0090821 A1 | 4/2013 | Abboud et al. |
| 2013/0164715 A1 | 6/2013 | Hunt et al. |
| 2013/0182116 A1 | 7/2013 | Arima |
| 2013/0268156 A1 | 10/2013 | Schumann et al. |
| 2013/0311250 A1 | 11/2013 | Hickethier et al. |
| 2014/0125678 A1 | 5/2014 | Wang et al. |
| 2014/0128146 A1 | 5/2014 | Story, Jr. et al. |
| 2014/0129130 A1 | 5/2014 | Kuramura et al. |
| 2014/0180725 A1 | 6/2014 | Ton-That et al. |
| 2014/0195106 A1 | 7/2014 | Mcquade et al. |
| 2014/0195272 A1 | 7/2014 | Sadiq et al. |
| 2014/0322674 A1 | 10/2014 | Livneh |
| 2014/0322676 A1 | 10/2014 | Raman |
| 2014/0347368 A1 | 11/2014 | Kishore et al. |
| 2014/0364238 A1 | 12/2014 | Koh et al. |
| 2015/0011315 A1 | 1/2015 | Sofman et al. |
| 2015/0081404 A1 | 3/2015 | Basir |
| 2015/0093722 A1 | 4/2015 | Fitzgerald et al. |
| 2015/0112504 A1 | 4/2015 | Binion et al. |
| 2015/0112540 A1 | 4/2015 | Rutkowski et al. |
| 2015/0120408 A1 | 4/2015 | Liu et al. |
| 2015/0178998 A1 | 6/2015 | Attard et al. |
| 2015/0187224 A1 | 7/2015 | Moncrief et al. |
| 2015/0212722 A1 | 7/2015 | Leung et al. |
| 2015/0294422 A1 | 10/2015 | Carver et al. |
| 2015/0310758 A1 | 10/2015 | Daddona et al. |
| 2016/0003636 A1 | 1/2016 | Ng-Thow-Hing et al. |
| 2016/0003836 A1 | 1/2016 | Stauber et al. |
| 2016/0084661 A1 | 3/2016 | Gautama et al. |
| 2016/0219024 A1 | 7/2016 | Verzun et al. |
| 2016/0371553 A1 | 12/2016 | Farnham, IV et al. |
| 2017/0061733 A1 | 3/2017 | Gulla et al. |
| 2017/0089710 A1 | 3/2017 | Slusar |
| 2017/0259177 A1 | 9/2017 | Aghdaie et al. |
| 2017/0323244 A1 | 11/2017 | Rani et al. |
| 2018/0060970 A1 | 3/2018 | Odour et al. |
| 2018/0247558 A1 | 8/2018 | Livneh |
| 2018/0286268 A1 | 10/2018 | Ni |
| 2018/0322700 A1 | 11/2018 | Carr et al. |
| 2018/0350144 A1 | 12/2018 | Rathod |
| 2019/0096134 A1 | 3/2019 | Amacker et al. |
| 2019/0108768 A1 | 4/2019 | Mohamed |
| 2019/0113927 A1 | 4/2019 | Englard et al. |
| 2019/0265703 A1 | 8/2019 | Hicok et al. |
| 2019/0384292 A1 | 12/2019 | Aragon et al. |
| 2020/0013306 A1 | 1/2020 | Mcquade et al. |
| 2020/0050719 A1 | 2/2020 | Fuerstenberg et al. |
| 2020/0074266 A1 | 3/2020 | Peake et al. |
| 2020/0104326 A1 | 4/2020 | Ricci |
| 2020/0139250 A1 | 5/2020 | Curtis et al. |
| 2020/0151943 A1 | 5/2020 | Navarrette et al. |
| 2020/0286253 A1 | 9/2020 | Chilcote-Bacco |
| 2020/0334762 A1 | 10/2020 | Carver et al. |
| 2020/0357075 A1 | 11/2020 | Dahl |

(56) References Cited

U.S. PATENT DOCUMENTS

| | | | |
|---|---|---|---|
| 2020/0391104 | A1 | 12/2020 | Nakamura et al. |
| 2021/0049925 | A1 | 2/2021 | Robinson et al. |
| 2021/0232632 | A1 | 7/2021 | Howard |
| 2021/0346805 | A1 | 11/2021 | Daniali |
| 2022/0242450 | A1 | 8/2022 | Sokolov et al. |
| 2022/0284077 | A1 | 9/2022 | Dahl et al. |

FOREIGN PATENT DOCUMENTS

| | | |
|---|---|---|
| CN | 108253982 | 7/2018 |
| CN | 108334090 | 7/2018 |
| CN | 108446027 | 8/2018 |
| CN | 109491394 | 3/2019 |
| CN | 110427682 | 11/2019 |
| CN | 210021183 | 2/2020 |
| DE | 102013213179 | 1/2015 |
| DE | 102018122864 | 3/2020 |
| DE | 102019205083 | 10/2020 |
| JP | 2014181927 | 9/2014 |
| KR | 1020130107481 | 10/2013 |
| KR | 102053754 | 12/2019 |
| WO | 2016148753 | 9/2016 |
| WO | 2019245578 | 12/2019 |
| WO | 2020172634 | 8/2020 |
| WO | 2020181001 | 9/2020 |

OTHER PUBLICATIONS

Ali et al., "Virtual Environment for Automobile Driving Test", In 2018 International Conference on Computing Sciences and Engineering (ICCSE), Mar. 2018, pp. 1-6. 2018.

Avouris et al., "A review of mobile location-based games for learning across physical and virtual spaces", J. UCS, vol. 18, No. 15, 2012, pp. 2120-2142. 2012.

Bozorgi et al., "A Time and Energy Efficient Routing Algorithm for Electric Vehicles Based on Historical Data", IEEE Transactions on Intelligent Vehicles, vol. 2, No. 4, 2017, pp. 2017.

Bui et al., "The Effects of Gamification on Driver Behavior: An Example from a Free Float Carsharing Service", 2015. 2015.

Culik et al., "Creating a Virtual Environment for Practical Driving Tests", In International Conference on Transport Systems Telematics, 2019, pp. 95-108. 2019.

Dooren et al., "Rewards That Make You Play: the Distinct Effect of Monetary Rewards, Virtual Point and Social Rewards on Play Persistence in Substance Dependent and Non-Dependent Adolescents", In 2018 IEEE 6th International Conference on Serious Games and Applications for Health (SeGAH), May 2018, pp. pp. 1-7. 2018.

Esser et al., "Towards learning a realistic rendering of human behavior", In Proceedings of the European Conference on Computer Vision (ECCV), 2018, (pp. 0-0). 2018.

Handel et al., "Insurance telematics: Opportunities and challenges with the smartphone solution", IEEE Intelligent Transportation Systems Magazine, vol. 6, No. 4, 2014, pp. 57-70. 2014.

Helvaci et al., "Improving Driver Behavior Using Gamication", In International Conference on Mobile Web and Intelligent Information Systems, Aug. 2018, pp. 193-204. 2018.

Herrtwich et al., "Cooperative Driving: Talking Telematics to the Next Level", In Traffic and Granular Flow'01, 2003, pp. 271-280. 2003.

International Search Report and Written Opinion received for PCT Patent Application No. PCT/US2021/013911, mailed on Mar. 31, 2021, 9 pages. 2021.

International Search Report and Written Opinion received for PCT Patent Application No. PCT/US2021/013918, mailed on Apr. 8, 2021, 10 pages. 2021.

International Search Report and Written Opinion received for PCT Patent Application No. PCT/US2021/013928, mailed on Apr. 2, 2021, 8 pages. 2021.

International Search Report and Written Opinion received for PCT Patent Application No. PCT/US2021/013930 mailed on Apr. 23, 2021, 12 pages. 2021.

Lang et al., "Synthesizing Personalized Training Programs for Improving Driving Habits via Virtual Reality", In 2018 IEEE Conference on Virtual Reality and 3D User Interfaces, Mar. 2018, pp. 297-304. 2018.

Liu et al., "Two Techniques for Assessing Virtual Agent Personality", IEEE Transactions on Affective Computing, vol. 7, No. 1, May 19, 2015, pp. 94-105. 2015.

Lopez et al., "Using pervasive games as learning tools educational contexts: a systematic review", International Journal of Learning Technology, vol. 13, No. 2, 2018, pp. 93-114. 2018.

Richter et.al, "Studying Gamification: The Effect of Rewards and Incentives on Motivation", In Gamification in education and business, 2015, pp. 21-46. 2015.

Sha et al., "Social vehicle navigation: integrating shared driving experience into vehicle navigation", In Proceedings of the 14th workshop on mobile computing systems applications, Feb. 2013, pp. 1-6. 2013.

Singh et al., "Real-time Collaboration Between Mixed Reality Users in Geo-referenced Virtual Environment", arXiv preprint arXiv, 2020, 2010.01023. 2020.

Stojaspal, Jan., "Gamification and telematics", available online at https://www.tu-auto.com/gamification-and-telematics/, 2013, 6 pages. 2013.

wiki.sc4devotion.com, SimCity 4 Encyclopedia, "Tutorial: Understanding the Traffic Simulator", pp. 1-15. Retrieved from the internet on Aug. 14, 2019: https://www.wiki.sc4devotion.com/index.php?title=Understanding_theTraffic_Simulator 2019.

Wilken et al., "Maps and the Autonomous Vehicle as a Communication Platform", International Journal of Communication, vol. 13, 2019 pp. 2703-2727. 2019.

"Drive Safe, Score Well: App is A Driving 'Report Card',"by Lynn Jolicoeur and Sacha Pfeiffer, published Oct. 9, 2014. Source: https://www.wbur.org/news/2014/10/09/safe-driving-app 2014.

"UK Telematics Online. Submitted articles relating to Vehicle Telematics," published Aug. 31, 2009. Source: https://web.archive.org/web/20090831075032/http://www.uktelematicsonline.co.uk/html/telematics_articles.html 2009.

SYSTEMS AND METHODS FOR GENERATING VIRTUAL CHARACTERS FOR A GAME

CROSS-REFERENCE TO RELATED APPLICATIONS

The following six applications were filed concurrently and are hereby incorporated by reference in their entirety for all purposes:
1. This application is a continuation of U.S. patent application Ser. No. 17/404,139, titled "Systems and Methods for Generating Virtual Characters for a Virtual Game", filed on Aug. 17, 2021, to be issued as U.S. Pat. No. 11,969,653, which also is hereby incorporated by reference in their entirety.
2. U.S. patent application Ser. No. 17/404,144, titled "Systems and Methods for Generating Virtual Experiences for a Virtual Game";
3. U.S. patent application Ser. No. 17/404,152, titled "Systems and Methods for Generating Virtual Encounters in Virtual Games";
4. U.S. patent application Ser. No. 17/404,158, titled "Systems and Methods for Generating Virtual Maps in Virtual Games";
5. U.S. patent application Ser. No. 17/404,164, titled "Systems and Methods for Generating Shared Virtual Maps in Virtual Games"; and
6. U.S. patent application Ser. No. 17/404,172, titled "Systems and Methods for Presenting Shared In-Game Objectives in Virtual Games".

FIELD OF THE DISCLOSURE

Some embodiments of the present disclosure are directed to generating virtual characters in a virtual game. More particularly, certain embodiments of the present disclosure provide methods and systems for generating the virtual characters using real-world telematics data associated with real-world drivers. Merely by way of example, the present disclosure has been applied to allowing the real-world drivers to play their generated virtual characters in the virtual game so as to improve the drivers' vehicle safety awareness. But it would be recognized that the present disclosure has much broader range of applicability.

BACKGROUND OF THE DISCLOSURE

While individuals generally exercise care while operating vehicles, it is still challenging for many vehicle operators to fully appreciate the risks associated with vehicle operations. As such, many vehicle operators may not be readily mindful of reducing such risks. Hence, it is highly desirable to develop new technologies that can increase a vehicle operator's appreciation and awareness of the risks posed by vehicle operation.

BRIEF SUMMARY OF THE DISCLOSURE

Some embodiments of the present disclosure are directed to generating virtual characters in a virtual game. More particularly, certain embodiments of the present disclosure provide methods and systems for generating the virtual characters using real-world telematics data associated with real-world drivers. Merely by way of example, the present disclosure has been applied to allowing the real-world drivers to play their generated virtual characters in the virtual game so as to improve the drivers' vehicle safety awareness. But it would be recognized that the present disclosure has much broader range of applicability.

According to certain embodiments, a method for generating one or more virtual characters includes receiving first real-world telematics data associated with one or more prior first real-world vehicle trips made by a first real-world user. Also, the method includes determining one or more first real-world driving characteristics based at least in part upon the first real-world telematics data before a first virtual character is generated. Additionally, the method includes determining one or more first virtual characteristics based at least in part upon the one or more first real-world driving characteristics and generating the first virtual character associated with the one or more first virtual characteristics. After the first virtual character is generated, the method includes presenting the first virtual character in a virtual game. Further, the method includes receiving second real-world telematics data associated with one or more prior second real-world vehicle trips made by a second real-world user. Also, the method includes determining one or more second real-world driving characteristics based at least in part upon the second real-world telematics data before a second virtual character is generated. Additionally, the method includes determining one or more second virtual characteristics based at least in part upon the one or more second real-world driving characteristics and generating the second virtual character associated with the one or more second virtual characteristics. After the second virtual character is generated, the method includes presenting the second virtual character in the virtual game. The one or more first real-world driving characteristics and the one or more second real-world driving characteristics are different. The one or more first virtual characteristics and the one or more second virtual characteristics are determined to be different in response to the one or more first real-world driving characteristics and the one or more second driving real-world characteristics being different. The first virtual character and the second virtual character are generated to be different with different virtual characteristics.

According to some embodiments, a computing device for generating one or more virtual characters includes one or more processors and a memory that stores instructions for execution by the one or more processors. The instructions, when executed, cause the one or more processors to receive first real-world telematics data associated with one or more prior first real-world vehicle trips made by a first real-world user. Also, the instructions, when executed, cause the one or more processors to determine one or more first real-world driving characteristics based at least in part upon the first real-world telematics data before a first virtual character is generated. Additionally, the instructions, when executed, cause the one or more processors to determine one or more first virtual characteristics based at least in part upon the one or more first real-world driving characteristics and generate the first virtual character associated with the one or more first virtual characteristics. After the first virtual character is generated, the instructions, when executed, cause the one or more processors to present the first virtual character in a virtual game. Further, the instructions, when executed, cause the one or more processors to receive second real-world telematics data associated with one or more prior second real-world vehicle trips made by a second real-world user. Also, the instructions, when executed, cause the one or more processors to determine one or more second real-world driving characteristics based at least in part upon the second real-world telematics data before a second virtual character is generated. Additionally, the instructions, when executed, cause the one or more processors to determine one or more second virtual characteristics based at least in part upon the one or more second real-world driving characteristics and generate the second virtual character associated with the one or more second virtual characteristics. After the second virtual character is generated, the instructions, when executed, cause the one or more processors to present the second virtual character in the virtual game. The one or more first real-world driving characteristics and the one or more second real-world driving characteristics are different. The one or more first virtual characteristics and the one or more second virtual characteristics are determined to be different in response to the one or more first real-world driving characteristics and the one or more second real-world driving characteristics being different. The first virtual character and the second virtual character are generated to be different with different virtual characteristics.

According to certain embodiments, a non-transitory computer-readable medium stores instructions for generating one or more virtual characters. The instructions are executed by one or more processors of a computing device. The non-transitory computer-readable medium includes instructions to receive first real-world telematics data associated with one or more prior first real-world vehicle trips made by a first real-world user. Also, the non-transitory computer-readable medium includes instructions to determine one or more first real-world driving characteristics based at least in part upon the first real-world telematics data before a first virtual character is generated. Additionally, the non-transitory computer-readable medium includes instructions to determine one or more first virtual characteristics based at least in part upon the one or more first real-world driving characteristics and generate the first virtual character associated with the one or more first virtual characteristics. After the first virtual character is generated, the non-transitory computer-readable medium includes instructions to present the first virtual character in a virtual game. Further, the non-transitory computer-readable medium includes instructions to receive second real-world telematics data associated with one or more prior second real-world vehicle trips made by a second real-world user. Also, the non-transitory computer-readable medium includes instructions to determine one or more second real-world driving characteristics based at least in part upon the second real-world telematics data before a second virtual character is generated. Additionally, the non-transitory computer-readable medium includes instructions to determine one or more second virtual characteristics based at least in part upon the one or more second real-world driving characteristics and generate the second virtual character associated with the one or more second virtual characteristics. After the second virtual character is generated, the non-transitory computer-readable medium includes instructions to present the second virtual character in the virtual game. The one or more first real-world driving characteristics and the one or more second real-world driving characteristics are different. The one or more first virtual characteristics and the one or more second virtual characteristics are determined to be different in response to the one or more first real-world driving characteristics and the one or more second real-world driving characteristics being different. The first virtual character and the second virtual character are generated to be different with different virtual characteristics.

Various embodiments include a system including one or more processors and one or more non-transitory computer-readable media storing computing instructions that, when executed on the one or more processors, cause the one or more processors to perform certain acts. The acts can include determining, by a computing device, one or more first real-world driving characteristics including a first real-world focus skill based at least in part upon first real-world telematics data. The acts also can include determining, by the computing device, one or more first virtual driving characteristics including a first virtual focus skill based at least in part upon the one or more first real-world driving characteristics. The acts further can include generating, by the computing device, a first virtual character associated with the one or more first virtual driving characteristics. The acts additionally can include presenting, by the computing device, the first virtual character in a virtual game. The acts also can include generating, by the computing device, a second virtual character associated with one or more second virtual driving characteristics based at least in part upon one or more second-real-world driving characteristics. The acts further can include presenting, by the computing device, the second virtual character in a virtual game. The one or more first virtual driving characteristics and the one or more second virtual driving characteristics can be determined to be different in response to differences between the one or more first real-world driving characteristics and the one or more second real-world driving characteristics.

A number of embodiments include a computer-implemented method for generating one or more virtual characters. The method can include determining, by a computing device, one or more first real-world driving characteristics including a first real-world focus skill based at least in part upon first real-world telematics data. The method also can include determining, by the computing device, one or more first virtual driving characteristics including a first virtual focus skill based at least in part upon the one or more first real-world driving characteristics. The method further can include generating, by the computing device, a first virtual character associated with the one or more first virtual driving characteristics. The method additionally can include presenting, by the computing device, the first virtual character in a virtual game. The method also can include generating, by the computing device, a second virtual character associated with one or more second virtual driving characteristics based at least in part upon one or more second-real-world driving characteristics. The method further can include presenting, by the computing device, the second virtual character in a virtual game. The one or more first virtual driving characteristics and the one or more second virtual driving characteristics can be determined to be different in response to differences between the one or more first real-world driving characteristics and the one or more second real-world driving characteristics.

Several embodiments can include one or more non-transitory computer-readable media storing computing instructions that, when executed by one or more processors, cause the one or more processors to perform certain acts. The acts can include determining, by a computing device, one or more first real-world driving characteristics including a first real-world focus skill based at least in part upon first real-world telematics data. The acts also can include determining, by the computing device, one or more first virtual driving characteristics including a first virtual focus skill based at least in part upon the one or more first real-world driving characteristics. The acts further can include generating, by the computing device, a first virtual character associated with the one or more first virtual driving characteristics. The acts additionally can include presenting, by the computing device, the first virtual character in a virtual game. The acts also can include generating, by the computing device, a second virtual character associated with one or more second virtual driving characteristics based at least in part upon one or more second-real-world driving characteristics. The acts further can include presenting, by the computing device, the second virtual character in a virtual game. The one or more first virtual driving characteristics and the one or more second virtual driving characteristics can be determined to be different in response to differences between the one or more first real-world driving characteristics and the one or more second real-world driving characteristics.

Depending upon the embodiment, one or more benefits may be achieved. These benefits and various additional objects, features and advantages of the present disclosure can be fully appreciated with reference to the detailed description and accompanying drawings that follow.

DETAILED DESCRIPTION OF THE DISCLOSURE

Some embodiments of the present disclosure are directed to generating virtual characters in a virtual game. More particularly, certain embodiments of the present disclosure provide methods and systems for generating the virtual characters using real-world telematics data associated with real-world drivers. Merely by way of example, the present disclosure has been applied to allowing the real-world drivers to play their generated virtual characters in the virtual game so as to improve the drivers' vehicle safety awareness. But it would be recognized that the present disclosure has much broader range of applicability.

Figure 1A:
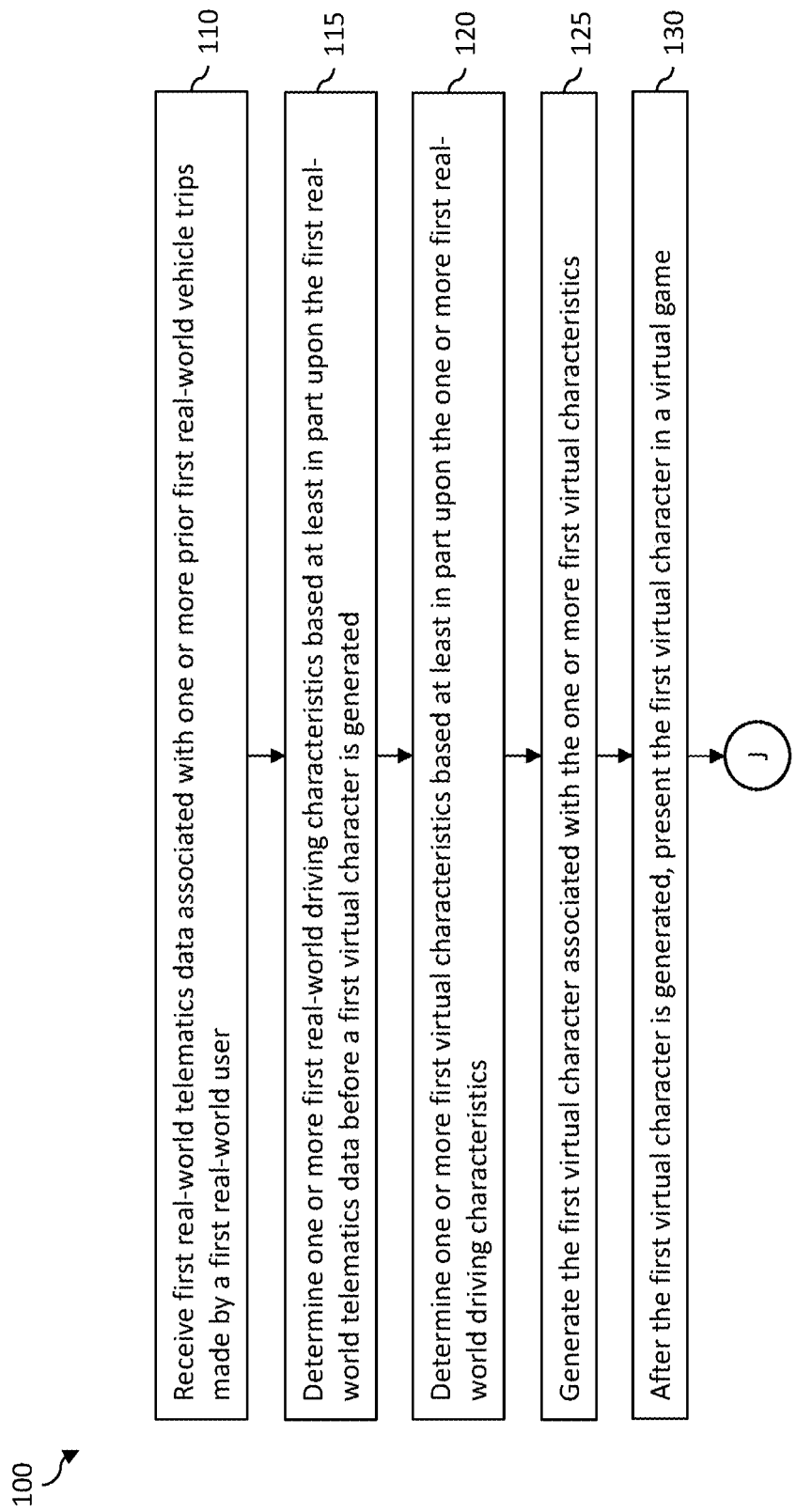
FIG. 1A and FIG. 1B show a simplified method for generating virtual characters according to certain embodiments of the present disclosure.
Figure 1B:
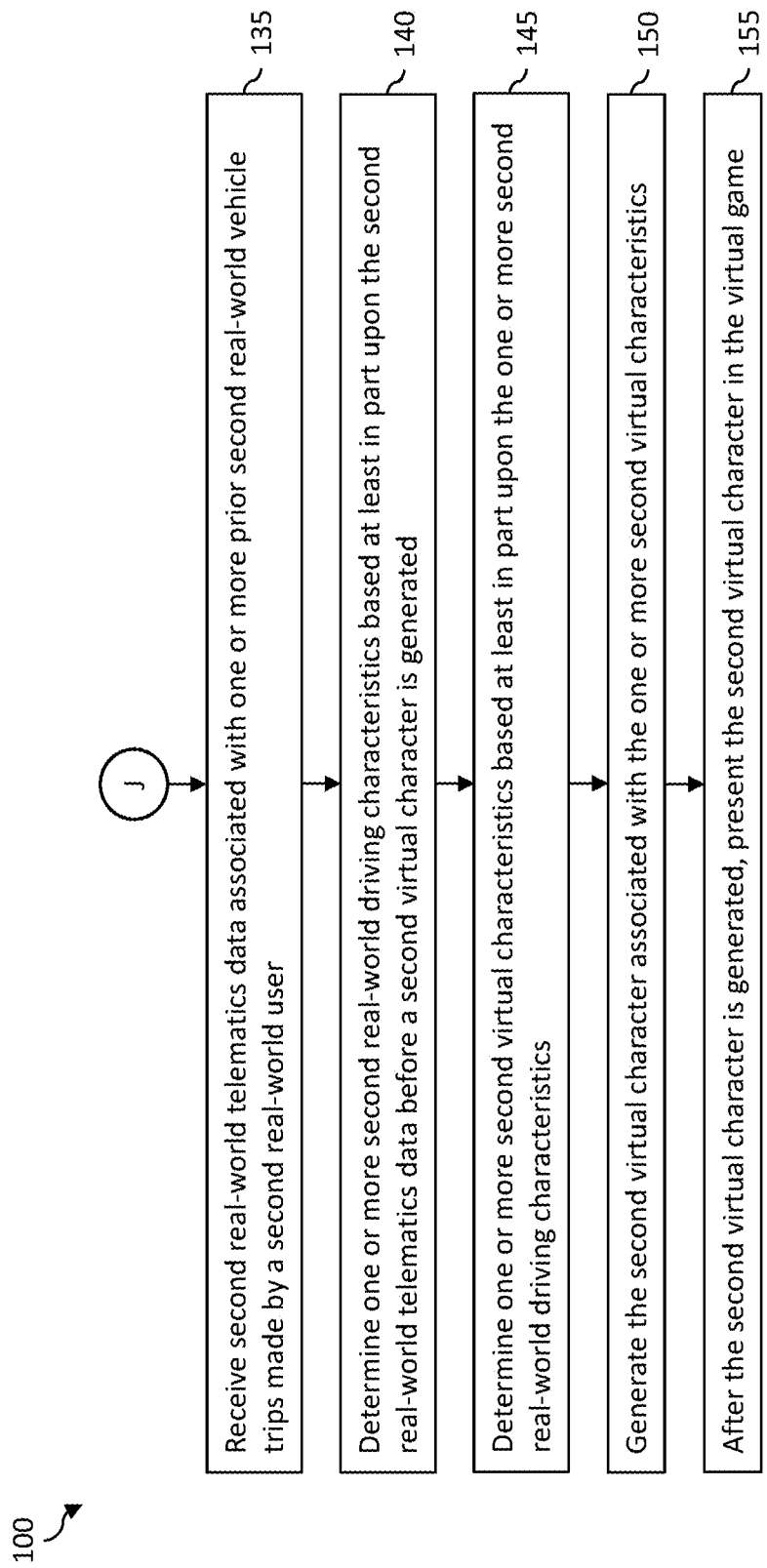

I. One or More Methods for Generating Virtual Characters According to Certain Embodiments FIG. 1A and FIG. 1B show a simplified method for generating virtual characters according to certain embodiments of the present disclosure. The figures are merely examples, which should not unduly limit the scope of the claims. One of ordinary skill in the art would recognize many variations, alternatives, and modifications. The method 100 includes process 110 for receiving first real-world telematics data from a first real-world user, process 115 for determining first real-world driving characteristics, process 120 for determining first virtual characteristics of a first virtual character, process 125 for generating the first virtual character, process 130 for presenting the first virtual character, process 135 for receiving second real-world telematics data from a second real-world user, process 140 for determining second real-world driving characteristics, process 145 for determining second virtual characteristics of a second virtual character, process 150 for generating the second virtual character, and process 155 for presenting the second virtual character. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, some or all processes of the method are performed by a computing device or a processor directed by instructions stored in memory. As an example, some or all processes of the method are performed according to instructions stored in a non-transitory computer-readable medium.

At the process 110, the first real-world telematics data associated with one or more prior first real-world vehicle trips made by the first real-world user are received according to some embodiments. In various embodiments, the first real-world user is a real-world driver of a first real-world vehicle. In certain embodiments, the one or more prior first real-world vehicle trips correspond to actual vehicle trips that the first real-world user has made in the past. For example, the one or more prior first real-world vehicle trips include actual vehicle trips made by the first real-world user to commute to and from work. As an example, the one or more prior first real-world vehicle trips include actual vehicle trips made by the first real-world user in running errands (e.g., grocery shopping, going to the post office, picking up a prescription, etc.). For example, the one or more prior first real-world vehicle trips include actual vehicle trips made by the first real-world user for any suitable personal and/or business reasons (e.g., city travels, road trips, business trips, family vacations, etc.).

In some embodiments, the first real-world telematics data are collected from one or more sensors associated with the first real-world vehicle operated by the first real-world user. For example, the one or more sensors include any type and number of accelerometers, gyroscopes, magnetometers, barometers, location sensors (e.g., GPS sensors), tilt sensors, yaw rate sensors, speedometers, brake sensors, airbag deployment sensors, windshield wiper sensors, headlight sensors, steering angle sensors, gear position sensors, proximity detectors, throttle sensors, gas tank sensors, battery sensors, and/or any other suitable sensors that measure vehicle state and/or operation. As an example, the first real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, and/or any other suitable sensors that measure vehicle state and/or operation. In certain embodiments, the one or more sensors are part of or located in the first real-world vehicle. For example, the one or more sensors communicate and store sensor data in an electronic control module (ECM) or an engine control unit (ECU) of the first real-world vehicle. In some embodiments, the one or more sensors are part of a computing device (e.g., a mobile device, a smart watch) that is connected to the first real-world vehicle. For example, the computing device is connected to the first real-world vehicle while the first real-world vehicle is in operation. As an example, the computing device is connected to the first real-world vehicle while the first real-world vehicle is stationary.

At the process 115, one or more first real-world driving characteristics are determined based at least in part upon the first real-world telematics data before the first virtual character is generated according to certain embodiments. In various embodiments, the one or more first real-world driving characteristics indicate how the first real-world user drives, such as how frequently the first real-world user drives, type of maneuvers that the first real-world user makes while driving (e.g., hard cornering, hard braking, sudden acceleration, smooth acceleration, slowing before turning, etc.), types of dangerous driving events (e.g., eating while driving, falling asleep while driving, etc.), types of safe driving events (e.g., maintaining safe following distance, turning on headlights, observing traffic lights, yielding to pedestrians, etc.), etc.

In some embodiments, the one or more first real-world driving characteristics refer to one or more driving skills of the first real-world user. For example, the one or more first real-world driving characteristics include a first braking characteristic, a first steering characteristic, a first speeding characteristic, and/or a first focus characteristic. As an example, the first braking characteristic corresponds to the first real-world user's ability to decelerate the first real-world vehicle upon encountering braking obstacles (e.g., T-junctions, stop signs, pedestrian crossings, etc.). For example, the first steering characteristic corresponds to the first real-world user's ability to steer the first real-world vehicle upon encountering steering obstacles (e.g., potholes, road kills, sharp turns, etc.). As an example, the first speeding characteristic corresponds to the first real-world user's ability to decelerate the first real-world vehicle upon encountering speeding obstacles (e.g., approaching a school zone, entering city limit, etc.). For example, the first focus characteristic corresponds to the first real-world user's ability to maintain or regain focus while operating the first real-world vehicle upon encountering focus obstacles (e.g., using a cell phone while driving).

In certain embodiments, the one or more first real-world driving characteristics include one or more first driving attributes associated with the first real-world user. For example, the one or more first driving attributes may include a first driving alertness (e.g., how attentive is the first real-world user while driving), a first driving reaction time (e.g., how fast can the first real-world user react to a given driving situation), a first driving risk-taking (e.g., how likely is the first real-world user to engage in risky driving behavior), a first driving information processing (e.g., how well can the first real-world user interpret inputs from driving environment), a first driving endurance (e.g., how long can the first real-world user drive without rest), and/or other suitable driving traits attributable to the first real-world user.

At the process 120, one or more first virtual characteristics are determined based at least in part upon the one or more first real-world driving characteristics according to some embodiments. In certain embodiments, the one or more first virtual characteristics correspond to a first plurality of virtual driving skills including a first virtual braking skill, a first virtual steering skill, a first virtual speeding skill, and/or a first virtual focus skill. In various embodiments, the first plurality of virtual driving skills are derived from the one or more first real-world driving characteristics of the first real-world user. For example, the first virtual braking skill is based at least in part upon the first braking characteristic. As an example, the first virtual steering skill is based at least in part upon the first steering characteristic. For example, the first virtual speeding skill is based at least in part upon the first speeding characteristic. As an example, the first virtual focus skill is based at least in part upon the first focus characteristic.

In some embodiments, the one or more first virtual characteristics include a first virtual alertness based at least in part upon the first driving alertness, a first virtual reaction time based at least in part upon the first driving reaction time, a first virtual risk-taking based at least in part upon the first driving risk-taking, a first virtual information processing based at least in part upon the first driving information processing, and/or a first virtual endurance based at least in part upon the first driving endurance.

At the process 125, the first virtual character associated with the one or more first virtual characteristics is generated according to certain embodiments. In various embodiments, the first virtual character is a digital representation (e.g., an avatar) of the first real-world user. For example, the first virtual character possesses the one or more first virtual characteristics, such as the first virtual braking skill, the first virtual steering skill, the first virtual speeding skill and/or the first virtual focus skill. As an example, the first virtual character is endowed with the one or more first virtual characteristics, such as the first virtual alertness, the first virtual reaction time, the first virtual risk-taking, the first virtual information processing, and/or the first virtual endurance.

At the process 130, the first virtual character is presented in a virtual game after the first virtual character is generated according to some embodiments. For example, the first virtual character is presented in a remote display (e.g., in a mobile device of the first real-world user). In various embodiments, the first virtual character exists in the virtual game as a controllable or playable character for the first real-world user. For example, after the first virtual character is generated, the first virtual character is activated or enabled such that the first real-world user can play the first virtual character in the virtual game.

In certain embodiments, a virtual driving environment is simulated in the virtual game in which the first virtual character is an operator of a first virtual vehicle. For example, after generating the first virtual character, the first real-world user can direct the first virtual character to operate the first virtual vehicle. As an example, an ability of the first virtual character to operate the first virtual vehicle is based at least in part upon the first virtual braking skill, the first virtual steering skill, the first virtual speeding skill and/or the first virtual focus skill.

In some embodiments, a virtual sporting environment is simulated in the virtual game in which the first virtual character is an athlete participating in a sporting event (e.g., track and field, basketball, tennis, boxing, swimming, etc.). For example, after generating the first virtual character, the first real-world user can direct the first virtual character to compete in the sporting event. As an example, an ability of first virtual character to compete in the sporting event is based at least in part upon the first virtual alertness, the first virtual reaction time, the first virtual risk-taking, the first virtual information processing, and/or the first virtual endurance.

In certain embodiments, a virtual battle environment is simulated in the virtual game in which the first virtual character is a combatant (e.g., warrior, soldier, etc.) fighting in a battle. For example, after generating the first virtual character, the first real-world user can direct the first virtual character to attack or defend in the battle. As an example, an ability of first virtual character to attack or defend in the battle is based at least in part upon the first virtual alertness, the first virtual reaction time, the first virtual risk-taking, the first virtual information processing, and/or the first virtual endurance.

In some embodiments, a virtual role-playing environment is simulated in the virtual game in which the first virtual character is a being/creature (e.g., knight, elf, vampire, robot, dragon, etc.) engaged in a quest. For example, after generating the first virtual character, the first real-world user can direct the first virtual character to accomplish a mission. As an example, an ability of first virtual character to accomplish the mission is based at least in part upon the first virtual alertness, the first virtual reaction time, the first virtual risk-taking, the first virtual information processing, and/or the first virtual endurance.

In certain embodiments, the first virtual character is not playable before the first virtual character is generated. For example, the first virtual character does not exist in the virtual game prior to generation. As an example, before the one or more first virtual characteristics are determined based at least in part upon the one or more first real-world driving characteristics, the first real-world user is not able to control or play the first virtual character in the virtual game.

At the process 135, the second real-world telematics data associated with one or more prior second real-world vehicle trips made by the second real-world user are received according to some embodiments. In various embodiments, the second real-world user is a real-world driver of a second real-world vehicle. In certain embodiments, the one or more prior second real-world vehicle trips correspond to actual vehicle trips that the second real-world user has made in the past. For example, the one or more prior second real-world vehicle trips include actual vehicle trips made by the second real-world user to commute between work and home. As an example, the one or more prior second real-world vehicle trips include actual vehicle trips made by the second real-world user for daily activities (e.g., going to the pharmacy, picking up kids from school, dropping off packages at the post office, etc.). For example, the one or more prior second real-world vehicle trips include actual vehicle trips made by the second real-world user for any suitable personal and/or business reasons.

In some embodiments, the second real-world telematics data are collected from one or more sensors associated with the second real-world vehicle operated by the second real-world user. For example, the one or more sensors include any type and number of accelerometers, gyroscopes, magnetometers, barometers, location sensors (e.g., GPS sensors), tilt sensors, yaw rate sensors, speedometers, brake sensors, airbag deployment sensors, headlight sensors, steering angle sensors, gear position sensors, windshield wiper sensors, proximity detectors, throttle sensors, gas tank sensors, battery sensors, and/or any other suitable sensors that measure vehicle state and/or operation. As an example, the second real-world telematics data include data collected by any type and number of accelerometers, gyroscopes, magnetometers, barometers, location sensors, tilt sensors, yaw rate sensors, speedometers, brake sensors, airbag sensors, windshield wiper sensors, headlight sensors, steering angle sensors, gear position sensors, proximity detectors, throttle sensors, gas tank sensors, battery sensors, and/or any other suitable sensors that measure vehicle state and/or operation. In certain embodiments, the one or more sensors are part of or located in the second real-world vehicle. For example, the one or more sensors communicate and store sensor data in an ECM or ECU of the second real-world vehicle. In some embodiments, the one or more sensors are part of a computing device that is connected to the second real-world vehicle. For example, the computing device is connected to the second real-world vehicle while the second real-world vehicle is in operation. As an example, the computing device is connected to the second real-world vehicle while the second real-world vehicle is stationary.

At the process 140, one or more second real-world driving characteristics are determined based at least in part upon the second real-world telematics data before the second virtual is generated according to certain embodiments. In various embodiments, the one or more second real-world driving characteristics indicate how the second real-world user drives, such as how frequently the second real-world user drives, type of maneuvers that the second real-world user makes while driving, types of safe and/or dangerous driving events, etc.

In some embodiments, the one or more second real-world driving characteristics refer to one or more driving skills of the second real-world user. For example, the one or more second real-world driving characteristics include a second braking characteristic, a second steering characteristic, a second speeding characteristic, and/or a second focus characteristic. As an example, the second braking characteristic corresponds to the second real-world user's ability to decelerate the second real-world vehicle upon encountering braking obstacles. For example, the second steering characteristic corresponds to the second real-world user's ability to steer the second real-world vehicle upon encountering steering obstacles. As an example, the second speeding characteristic corresponds to the second real-world user's ability to decelerate the second real-world vehicle upon encountering speeding obstacles. For example, the second focus characteristic corresponds to the second real-world user's ability to maintain or regain focus while operating the second real-world vehicle upon encountering focus obstacles.

In certain embodiments, the one or more second real-world driving characteristics include one or more second driving attributes associated with the second real-world user. For example, the one or more second driving attributes may include a second driving alertness (e.g., how attentive is the second real-world user while driving), a second driving reaction time (e.g., how fast can the second real-world user react to a given driving situation), a second driving risk-taking (e.g., how likely is the second real-world user to engage in risky driving behavior), a second driving information processing (e.g., how well can the second real-world user interpret inputs from driving environment), a second driving endurance (e.g., how long can the second real-world user drive without rest), and/or other suitable driving traits attributable to the second real-world user.

According to various embodiments, the one or more second real-world driving characteristics are different from the one or more first real-world driving characteristics. For example, the first real-world user may be an experienced driver with many years of driving experience, while the second real-world user may be a novice driver with only a few months of driving experience. As an example, the first real-world user will have more developed braking and/or steering skills when compared to the second real-world user. For example, the first real-world user may be an adult driver who does not engage in cell phone usage during vehicle operation, while the second real-world driver may be a teenage driver who is frequently distracted by cell phone usage while driving. As an example, the first real-world user can maintain better attention or alertness while driving when compared to the second real-world user. For example, the first real-world user is a more careful driver than the second real-world user. As an example, the first real-world user tends to slow down more when driving through residential streets when compared to the second real-world user.

At the process 145, one or more second virtual characteristics are determined based at least in part upon the one or more second real-world driving characteristics according to some embodiments. In certain embodiments, the one or more second virtual characteristics correspond to a second plurality of virtual driving skills including a second virtual braking skill, a second virtual steering skill, a second virtual speeding skill, and/or a second virtual focus skill. In various embodiments, the second plurality of virtual driving skills are derived from the one or more second real-world driving characteristics of the second real-world user. For example, the second virtual braking skill is based at least in part upon the second braking characteristic. As an example, the second virtual steering skill is based at least in part upon the second steering characteristic. For example, the second virtual speeding skill is based at least in part upon the second speeding characteristic. As an example, the second virtual focus skill is based at least in part upon the second focus characteristic.

In some embodiments, the one or more second virtual characteristics include a second virtual alertness based at least in part upon the second driving alertness, a second virtual reaction time based at least in part upon the second driving reaction time, a second virtual risk-taking based at least in part upon the second driving risk-taking, a second virtual information processing based at least in part upon the second driving information processing, and/or a second virtual endurance based at least in part upon the second driving endurance.

According to some embodiments, the one or more second virtual characteristics are determined to be different from the one or more first virtual characteristics in response to the one or more second real-world driving characteristics being different from the one or more first driving real-world characteristics. For example, the first virtual braking skill is different from the second virtual braking skill, the first virtual steering skill is different from the second virtual steering skill, the first virtual speeding skill is different from the second virtual speeding skill, and/or the first virtual focus skill is different from the second virtual focus skill. As an example, the first virtual alertness is different from the second virtual alertness, the first virtual reaction time is different from the second virtual reaction time, the first virtual risk-taking is different from the second virtual risk-taking, the first virtual information processing is different from the second virtual risk-taking, and/or the first virtual endurance is different from the second virtual endurance.

In certain embodiments, the first and second virtual characteristics are different because the first and second virtual characteristics are assigned with different scores to indicate different levels of competency. For example, the first braking characteristic of the first real-world user may be more developed than the second braking characteristic of the second real-world user due to more frequent driving on the part of the first real-world user. As an example, the first virtual braking skill may be assigned a higher score than the second virtual braking skill. For example, the first virtual braking skill is assigned a score of 100 out of 100 while the second virtual braking skill is assigned a score of 60 out of 100. As an example, the first driving reaction time of the first real-world user may be more than the second driving reaction time of the second real-world user because the first real-world user has less years of driving experience. As an example, the first virtual reaction time may be assigned a lower score than the second virtual reaction time.

In some embodiments, the first and second virtual characteristics are different because the first and second virtual characteristics are weighted differently due to other factors. For example, the first real-world user may have zero speeding violations while the second real-world user may have multiple speeding violations. As an example, the first speeding characteristic of the first real-world user may be weighted with a value different from the second speeding characteristic of the second real-world user. For example, the first virtual speeding skill may be weighted with a higher value than the second virtual speeding skill.

In certain embodiments, the first and second virtual characteristics are different because some of the first and/or second virtual characteristics may not exist. For example, there may not be any information in the first real-world telematics data to determine the first driving information processing of the first real-world user, while there is information in the second real-world telematics data to determine the second driving information processing of the second real-world user. As an example, when compared, the first virtual information processing will be missing while the second virtual information processing will be present.

According to certain embodiments, the one or more second virtual characteristics are determined to be the same as the one or more first virtual characteristics in response to the one or more second real-world driving characteristics being the same as the one or more first driving real-world characteristics. For example, the first real-world user and the second real-world user share similar real-world driving characteristics. As an example, the first virtual steering skill is the same as the second virtual steering skill, the first virtual braking skill is the same as the second virtual braking skill, the first virtual speeding skill is the same as the second virtual speeding skill, and/or the first virtual focus skill is the same as the second virtual focus skill. For example, the first virtual alertness is the same as the second virtual alertness, the first virtual reaction time is the same as the second virtual reaction time, the first virtual risk-taking is the same as the second virtual risk-taking, the first virtual information processing is the same as the second virtual risk-taking, and/or the first virtual endurance is the same as the second virtual endurance.

At the process 150, the second virtual character associated with the one or more second virtual characteristics are generated according to some embodiments. In various embodiments, the second virtual character is a digital representation (e.g., an avatar) of the second real-world user. For example, the second virtual character possesses the one or more second virtual characteristics, such as the second virtual braking skill, the second virtual steering skill, the second virtual speeding skill and/or the second virtual focus skill. As an example, the second virtual character is endowed with the one or more second virtual characteristics, such as the second virtual alertness, the second virtual reaction time, the second virtual risk-taking, the second virtual information processing, and/or the second virtual endurance. In certain embodiments, the first virtual character and the second virtual character are generated to be different with different virtual characteristics.

At the process 155, the second virtual character is presented in the virtual game after the second virtual character is generated according to some embodiments. For example, the second virtual character is presented in a remote display (e.g., in a mobile device of the second real-world user). In various embodiments, the second virtual character exists in the virtual game as a controllable or playable character for the second real-world user. For example, after the second virtual character is generated, the second virtual character is activated or enabled such that the second real-world user can play the second virtual character in the virtual game.

In certain embodiments where the virtual driving environment is simulated in the virtual game, the second virtual character operates a second virtual vehicle. For example, after generating the second virtual character, the second real-world user can direct the second virtual character to operate the second virtual vehicle. As an example, an ability of the second virtual character to operate the second virtual vehicle is based at least in part upon the second virtual braking skill, the second virtual steering skill, the second virtual speeding skill and/or the second virtual focus skill.

In some embodiments where the virtual sporting environment is simulated in the virtual game, the second virtual character participates in the sporting event as another athlete. For example, after generating the second virtual character, the second real-world user can direct the second virtual character to compete in the sporting event. As an example, an ability of second virtual character to compete in the sporting event is based at least in part upon the second virtual alertness, the second virtual reaction time, the second virtual risk-taking, the second virtual information processing, and/or the second virtual endurance.

In certain embodiments where the virtual battle environment is simulated in the virtual game, the second virtual character fights in the battle as another combatant. For example, after generating the second virtual character, the second real-world user can direct the second virtual character to attack or defend in the battle. As an example, an ability of second virtual character to attack or defend in the battle is based at least in part upon the second virtual alertness, the second virtual reaction time, the second virtual risk-taking, the second virtual information processing, and/or the second virtual endurance.

In some embodiments where the virtual role-playing environment is simulated in the virtual game, the second virtual character engages in the quest as another being/creature. For example, after generating the second virtual character, the second real-world user can direct the second virtual character to accomplish the mission (or other missions). As an example, an ability of second virtual character to accomplish the mission is based at least in part upon the second virtual alertness, the second virtual reaction time, the second virtual risk-taking, the second virtual information processing, and/or the second virtual endurance.

In certain embodiments, the second virtual character is not playable before the second virtual character is generated. For example, the second virtual character does not exist in the virtual game prior to generation. As an example, before the one or more second virtual characteristics are determined based at least in part upon the one or more second real-world driving characteristics, the second real-world user is not able to control or play the second virtual character in the virtual game.

In certain embodiments, the second virtual character is presented in the same virtual game as the first virtual character. In some embodiments, the first and second virtual characters are presented in different virtual games. For example, the first virtual character is presented in a first virtual game played by the first real-world user and the second virtual character is presented in a second virtual game played by the second real-world user.

As discussed above and further emphasized here, FIG. 1A and FIG. 1B are merely examples, which should not unduly limit the scope of the claims. One of ordinary skill in the art would recognize many variations, alternatives, and modifications. In some examples, at the process 110, in addition to the first real-world telematics data, data from video or photographic capturing devices are also received. For example, the video or photographic capturing devices may be utilized to capture images internally or externally to the first real-world vehicle to determine the one or more first real-world driving characteristics and/or conditions surrounding the first real-world vehicle. In certain examples, at the process 135, in addition to the second real-world telematics data, data from video or photographic capturing devices are also received. For example, the video or photographic capturing devices may be utilized to capture images internally or externally to the second real-world vehicle to determine the one or more second real-world driving characteristics and/or conditions surrounding the second real-world vehicle. In some examples, at the process 130, the first virtual character is generated and presented in the virtual game. In certain examples, at the process 155, the second virtual character is generated and presented in the virtual game.

Figure 2:
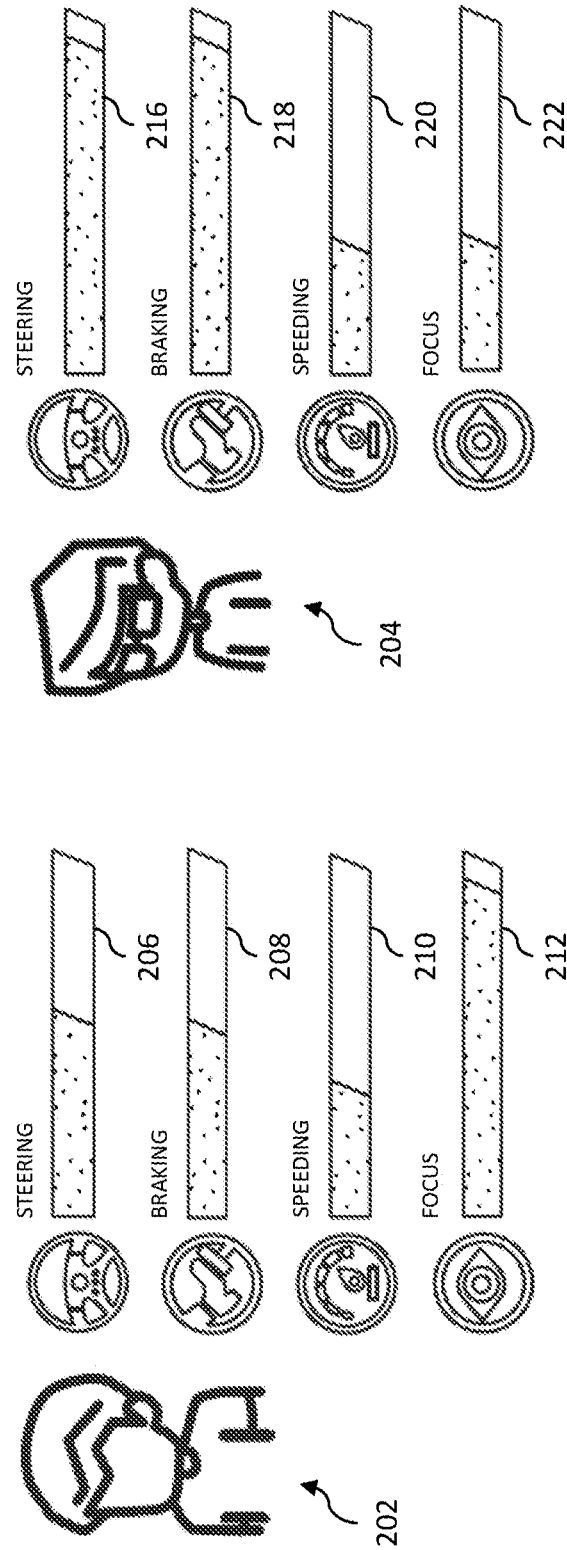
FIG. 2 shows a simplified diagram illustrating virtual characters according to certain embodiments of the present disclosure.

FIG. 2 shows a simplified diagram illustrating one or more virtual characters that are generated by the method 100 as shown in FIG. 1A and FIG. 1B according to some embodiments of the present disclosure. This figure is merely an example, which should not unduly limit the scope of the claims. One of ordinary skill in the art would recognize many variations, alternatives, and modifications.

In certain embodiments, the first virtual character that has been generated by the method 100 is represented by an avatar 202, while the second virtual character that has been generated by the method 100 is represented by an avatar 204. In some embodiments where the virtual driving environment is simulated in the virtual game, the avatars 202 and 204 operate respective virtual vehicles and have respective virtual characteristics. For example, the avatar 202 possesses the first plurality of virtual driving skills including a first virtual steering skill 206, a first virtual braking skill 208, a first virtual speeding skill 210, and a first virtual focus skill 212. As an example, the avatar 204 possesses the second plurality of virtual driving skills including a second virtual steering skill 216, a second virtual braking skill 218, a second virtual speeding skill 220, and a second virtual focus skill 222. In certain embodiments, each of the first plurality of virtual driving skills may be the same or different from each of the second plurality of driving skills. For example, the first virtual steering skill 206 is worse than the second virtual steering skill 216. As an example, the first virtual braking skill 208 is worse than the second virtual braking skill 218. For example, the first virtual speeding skill 210 is the same as the second virtual speeding skill 220. As an example, the first virtual focus skill 212 is better than the second virtual focus skill 222.

Figure 3:
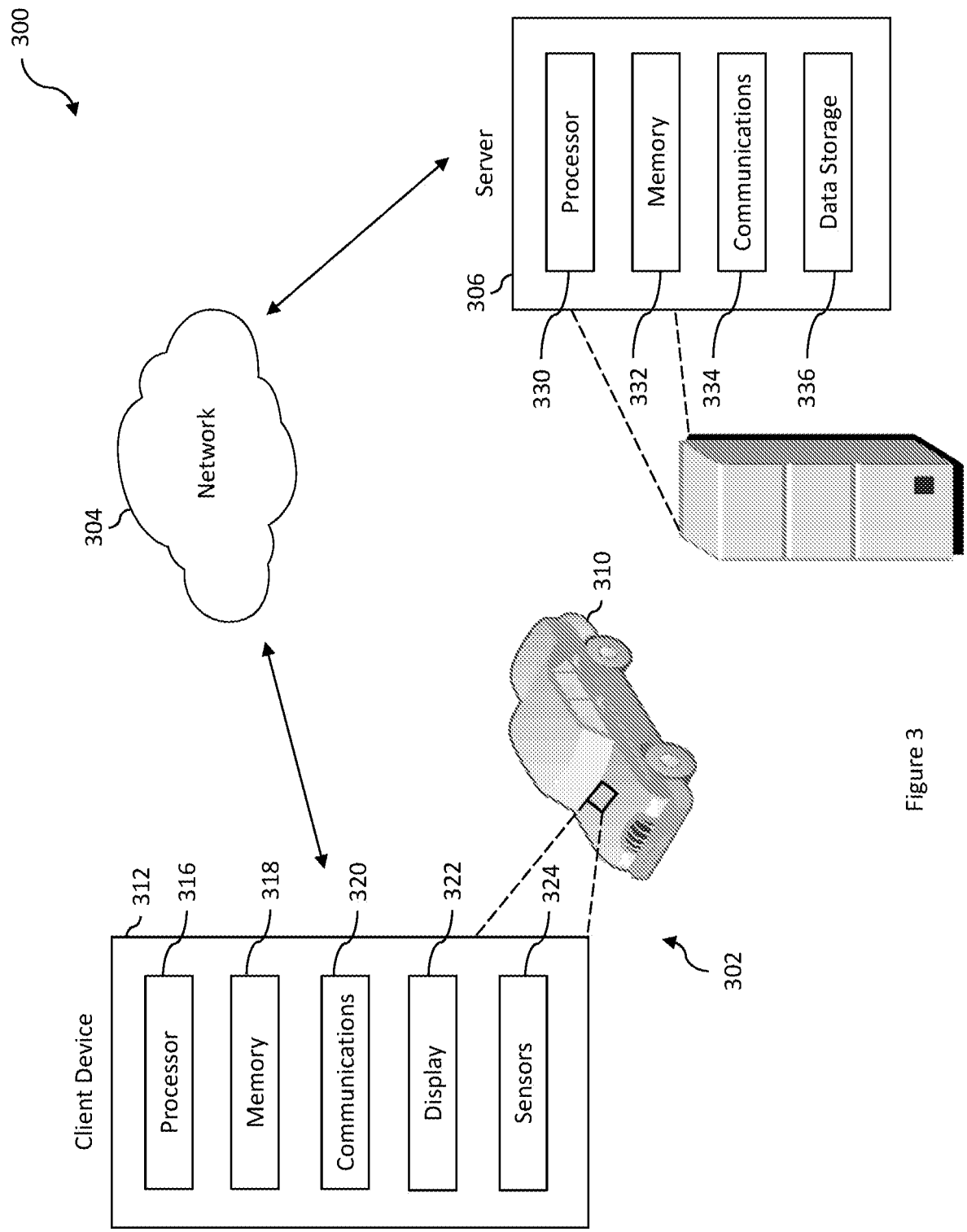
FIG. 3 shows a simplified system for generating virtual characters according to certain embodiments of the present disclosure.

II. One or More Systems for Generating Virtual Characters According to Certain Embodiments FIG. 3 shows a simplified system for generating virtual characters according to certain embodiments of the present disclosure. This figure is merely an example, which should not unduly limit the scope of the claims. One of ordinary skill in the art would recognize many variations, alternatives, and modifications. The system 300 includes a vehicle system 302, a network 304, and a server 306. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 300 is used to implement the method 100. According to certain embodiments, the vehicle system 302 includes a vehicle 310 and a client device 312 associated with the vehicle 310. For example, the client device 312 is an on-board computer embedded or located in the vehicle 310. As an example, the client device 312 is a mobile device (e.g., a smartphone) that is connected (e.g., via wired or wireless links) to the vehicle 310. For example, the client device 312 includes a processor 316 (e.g., a central processing unit (CPU), a graphics processing unit (GPU)), a memory 318 (e.g., random-access memory (RAM), read-only memory (ROM), flash memory), a communications unit 320 (e.g., a network transceiver), a display unit 322 (e.g., a touchscreen), and one or more sensors 324 (e.g., an accelerometer, a gyroscope, a magnetometer, a barometer, a GPS sensor). In certain embodiments, the client device 312 represents the on-board computer in the vehicle 310 and the mobile device connected to the vehicle 310. For example, the one or more sensors 324 may be in the vehicle 310 and in the mobile device connected to the vehicle 310.

In some embodiments, the vehicle 310 is operated by a real-world user, such as the first real-world user and/or the second real-world user. In certain embodiments, multiple vehicles 310 exist in the system 300 which are operated by respective users. For example, the first real-world user operates the first real-world vehicle and the second real-world user operates the second real-world vehicle.

In various embodiments, during vehicle trips, the one or more sensors 324 monitor the vehicle 310 by collecting data associated with various operating parameters of the vehicle, such as speed, acceleration, braking, location, engine status, fuel level, as well as other suitable parameters. In certain embodiments, the collected data include vehicle telematics data. According to some embodiments, the data are collected continuously, at predetermined time intervals, and/or based on a triggering event (e.g., when each sensor has acquired a threshold amount of sensor measurements). In various embodiments, the collected data represent the first real-world telematics data and/or the second real-world telematics data in the method 100.

According to certain embodiments, the collected data are stored in the memory 318 before being transmitted to the server 306 using the communications unit 320 via the network 304 (e.g., via a local area network (LAN), a wide area network (WAN), the Internet). In some embodiments, the collected data are transmitted directly to the server 306 via the network 304. For example, the collected data are transmitted to the server 306 without being stored in the memory 318. In certain embodiments, the collected data are transmitted to the server 306 via a third party. For example, a data monitoring system stores any and all data collected by the one or more sensors 324 and transmits those data to the server 306 via the network 304 or a different network.

According to some embodiments, the server 306 includes a processor 330 (e.g., a microprocessor, a microcontroller), a memory 332, a communications unit 334 (e.g., a network transceiver), and a data storage 336 (e.g., one or more databases). In some embodiments, the server 306 is a single server, while in certain embodiments, the server 306 includes a plurality of servers with distributed processing. In FIG. 3, the data storage 336 is shown to be part of the server 306. In certain embodiments, the data storage 336 is a separate entity coupled to the server 306 via a network such as the network 304. In some embodiments, the server 306 includes various software applications stored in the memory 332 and executable by the processor 330. For example, these software applications include specific programs, routines, or scripts for performing functions associated with the method 100. As an example, the software applications include general-purpose software applications for data processing, network communication, database management, web server operation, and/or other functions typically performed by a server.

According to various embodiments, the server 306 receives, via the network 304, the data collected by the one or more sensors 324 using the communications unit 334 and stores the data in the data storage 336. For example, the server 306 then processes the data to perform one or more processes of the method 100.

According to certain embodiments, any related information determined or generated by the method 100 (e.g., real-world driving characteristics, virtual characteristics, virtual characters, etc.) are transmitted back to the client device 312, via the network 304, to be provided (e.g., displayed) to the user via the display unit 322.

In some embodiments, one or more processes of the method 100 are performed by the client device 312. For example, the processor 316 of the client device 312 processes the data collected by the one or more sensors 324 to perform one or more processes of the method 100.

Figure 4:
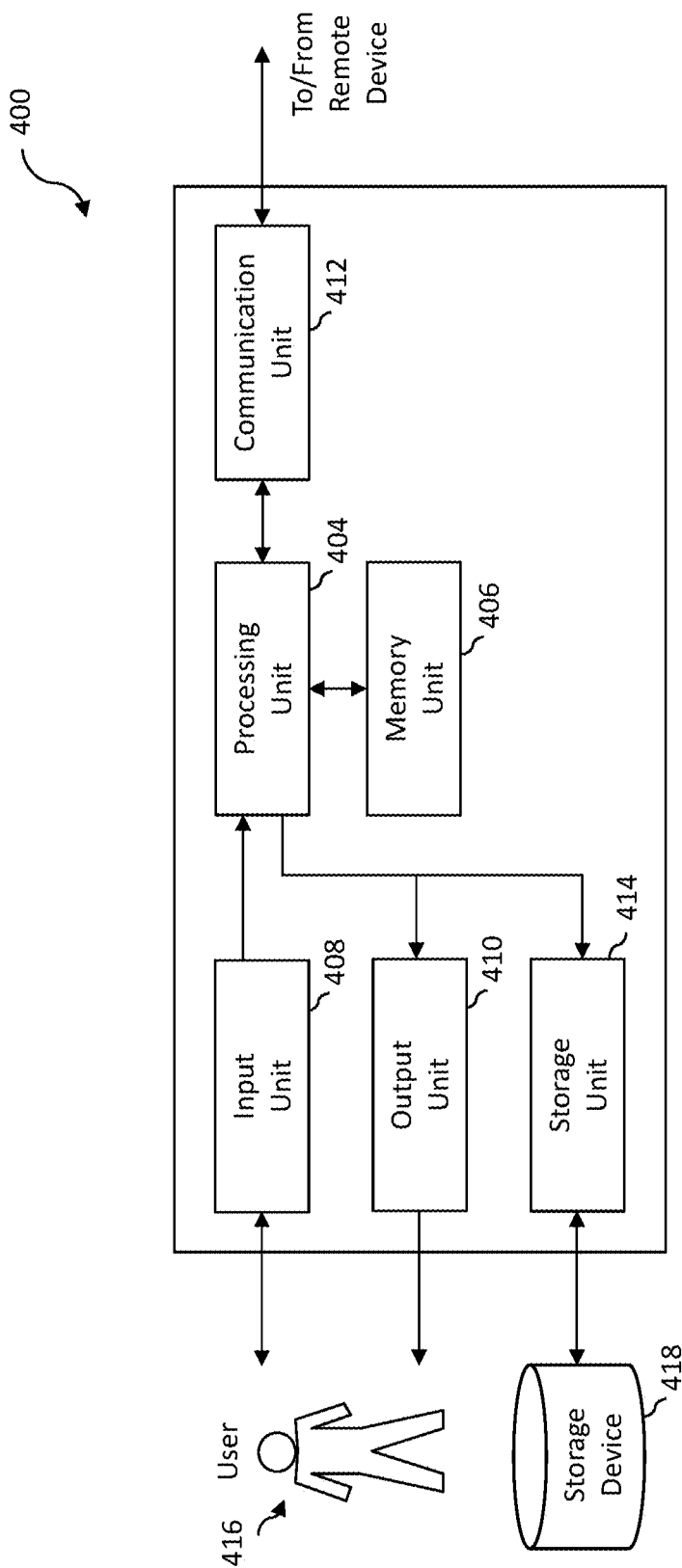
FIG. 4 shows a simplified computing device for generating virtual characters according to certain embodiments of the present disclosure.

III. One or More Computing Devices for Generating Virtual Characters According to Certain Embodiments FIG. 4 shows a simplified computing device for generating virtual characters according to certain embodiments of the present disclosure. This figure is merely an example, which should not unduly limit the scope of the claims. One of ordinary skill in the art would recognize many variations, alternatives, and modifications. The computing device 400 includes a processing unit 404, a memory unit 406, an input unit 408, an output unit 410, a communication unit 412, and a storage unit 414. In various embodiments, the computing device 400 is configured to be in communication with a user 416 and/or a storage device 418. In certain embodiments, the computing device 400 includes the client device 312 and/or the server 306 of FIG. 3. In some embodiments, the computing device 400 is configured to implement the method 100 of FIG. 1A and/or FIG. 1B. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the processing unit 404 is configured for executing instructions, such as instructions to implement the method 100 of FIG. 1A and/or FIG. 1B. In some embodiments, the executable instructions are stored in the memory unit 406. In certain embodiments, the processing unit 404 includes one or more processing units (e.g., in a multi-core configuration). In some embodiments, the processing unit 404 includes and/or is communicatively coupled to one or more modules for implementing the methods and systems described in the present disclosure. In certain embodiments, the processing unit 404 is configured to execute instructions within one or more operating systems. In some embodiments, upon initiation of a computer-implemented method, one or more instructions is executed during initialization. In certain embodiments, one or more operations is executed to perform one or more processes described herein. In some embodiments, an operation may be general or specific to a particular programming language (e.g., C, C++, Java, or other suitable programming languages, etc.).

In various embodiments, the memory unit 406 includes a device allowing information, such as executable instructions and/or other data to be stored and retrieved. In some embodiments, the memory unit 406 includes one or more computer readable media. In certain embodiments, the memory unit 406 includes computer readable instructions for providing a user interface, such as to the user 416, via the output unit 410. In some embodiments, a user interface includes a web browser and/or a client application. For example, a web browser enables the user 416 to interact with media and/or other information embedded on a web page and/or a website. In certain embodiments, the memory unit 406 includes computer readable instructions for receiving and processing an input via the input unit 408. In some embodiments, the memory unit 406 includes RAM such as dynamic RAM (DRAM) or static RAM (SRAM), ROM, erasable programmable read-only memory (EPROM), electrically erasable programmable read-only memory (EEPROM), and/or non-volatile RAM (NVRAM).

In various embodiments, the input unit 408 is configured to receive input (e.g., from the user 416). In some embodiments, the input unit 408 includes a keyboard, a pointing device, a mouse, a stylus, a touch sensitive panel (e.g., a touch pad or touch screen), a gyroscope, an accelerometer, a position sensor (e.g., GPS sensor), and/or an audio input device. In certain embodiments, the input unit 408 is configured to function as both an input unit and an output unit.

In various embodiments, the output unit 410 includes a media output unit configured to present information to the user 416. In some embodiments, the output unit 410 includes any component capable of conveying information to the user 416. In certain embodiments, the output unit 410 includes an output adapter such as a video adapter and/or an audio adapter. For example, the output unit 410 is operatively coupled to the processing unit 404 and/or a visual display device to present information to the user 416 (e.g., a liquid crystal display (LCD), a light emitting diode (LED) display, an organic light emitting diode (OLED) display, a cathode ray tube (CRT) display, a projected display, etc.). As an example, the output unit 410 is operatively coupled to the processing unit 404 and/or an audio display device to present information to the user 416 (e.g., a speaker arrangement or headphones).

In various embodiments, the communication unit 412 is configured to be communicatively coupled to a remote device. In some embodiments, the communication unit 412 includes a wired network adapter, a wireless network adapter, a wireless data transceiver for use with a mobile phone network (e.g., 3G, 4G, 5G, Bluetooth, near-field communication (NFC), etc.), and/or other mobile data networks. In certain embodiments, other types of short-range or long-range networks may be used. In some embodiments, the communication unit 412 is configured to provide email integration for communicating data between a server and one or more clients.

In various embodiments, the storage unit 414 is configured to enable communication between the computing device 400 and the storage device 418. In some embodiments, the storage unit 414 is a storage interface. For example, the storage interface is any component capable of providing the processing unit 404 with access to the storage device 418. In certain embodiments, the storage unit 414 includes an advanced technology attachment (ATA) adapter, a serial ATA (SATA) adapter, a small computer system interface (SCSI) adapter, a RAID controller, a SAN adapter, a network adapter, and/or any other component capable of providing the processing unit 404 with access to the storage device 418.

In various embodiments, the storage device 418 includes any computer-operated hardware suitable for storing and/or retrieving data. In certain embodiments, the storage device 418 is integrated in the computing device 400. In some embodiments, the storage device 418 includes a database such as a local database or a cloud database. In certain embodiments, the storage device 418 includes one or more hard disk drives. In some embodiments, the storage device 418 is external and is configured to be accessed by a plurality of server systems. In certain embodiments, the storage device 418 includes multiple storage units such as hard disks or solid state disks in a redundant array of inexpensive disks configuration. In some embodiments, the storage device 418 includes a storage area network and/or a network attached storage system.

IV. Examples of Certain Embodiments of the Present Disclosure

According to certain embodiments, a method for generating one or more virtual characters includes receiving first real-world telematics data associated with one or more prior first real-world vehicle trips made by a first real-world user. Also, the method includes determining one or more first real-world driving characteristics based at least in part upon the first real-world telematics data before a first virtual character is generated. Additionally, the method includes determining one or more first virtual characteristics based at least in part upon the one or more first real-world driving characteristics and generating the first virtual character associated with the one or more first virtual characteristics. After the first virtual character is generated, the method includes presenting the first virtual character in a virtual game. Further, the method includes receiving second real-world telematics data associated with one or more prior second real-world vehicle trips made by a second real-world user. Also, the method includes determining one or more second real-world driving characteristics based at least in part upon the second real-world telematics data before a second virtual character is generated. Additionally, the method includes determining one or more second virtual characteristics based at least in part upon the one or more second real-world driving characteristics and generating the second virtual character associated with the one or more second virtual characteristics. After the second virtual character is generated, the method includes presenting the second virtual character in the virtual game. The one or more first real-world driving characteristics and the one or more second real-world driving characteristics are different. The one or more first virtual characteristics and the one or more second virtual characteristics are determined to be different in response to the one or more first real-world driving characteristics and the one or more second driving real-world characteristics being different. The first virtual character and the second virtual character are generated to be different with different virtual characteristics. For example, the method is implemented according to at least FIG. 1A and FIG. 1B.

According to some embodiments, a computing device for generating one or more virtual characters includes one or more processors and a memory that stores instructions for execution by the one or more processors. The instructions, when executed, cause the one or more processors to receive first real-world telematics data associated with one or more prior first real-world vehicle trips made by a first real-world user. Also, the instructions, when executed, cause the one or more processors to determine one or more first real-world driving characteristics based at least in part upon the first real-world telematics data before a first virtual character is generated. Additionally, the instructions, when executed, cause the one or more processors to determine one or more first virtual characteristics based at least in part upon the one or more first real-world driving characteristics and generate the first virtual character associated with the one or more first virtual characteristics. After the first virtual character is generated, the instructions, when executed, cause the one or more processors to present the first virtual character in a virtual game. Further, the instructions, when executed, cause the one or more processors to receive second real-world telematics data associated with one or more prior second real-world vehicle trips made by a second real-world user. Also, the instructions, when executed, cause the one or more processors to determine one or more second real-world driving characteristics based at least in part upon the second real-world telematics data before a second virtual character is generated. Additionally, the instructions, when executed, cause the one or more processors to determine one or more second virtual characteristics based at least in part upon the one or more second real-world driving characteristics and generate the second virtual character associated with the one or more second virtual characteristics. After the second virtual character is generated, the instructions, when executed, cause the one or more processors to present the second virtual character in the virtual game. The one or more first real-world driving characteristics and the one or more second real-world driving characteristics are different. The one or more first virtual characteristics and the one or more second virtual characteristics are determined to be different in response to the one or more first real-world driving characteristics and the one or more second real-world driving characteristics being different. The first virtual character and the second virtual character are generated to be different with different virtual characteristics. For example, the computing device is implemented according to at least FIG. 3 and/or FIG. 4.

According to certain embodiments, a non-transitory computer-readable medium stores instructions for generating one or more virtual characters. The instructions are executed by one or more processors of a computing device. The non-transitory computer-readable medium includes instructions to receive first real-world telematics data associated with one or more prior first real-world vehicle trips made by a first real-world user. Also, the non-transitory computer-readable medium includes instructions to determine one or more first real-world driving characteristics based at least in part upon the first real-world telematics data before a first virtual character is generated. Additionally, the non-transitory computer-readable medium includes instructions to determine one or more first virtual characteristics based at least in part upon the one or more first real-world driving characteristics and generate the first virtual character associated with the one or more first virtual characteristics. After the first virtual character is generated, the non-transitory computer-readable medium includes instructions to present the first virtual character in a virtual game. Further, the non-transitory computer-readable medium includes instructions to receive second real-world telematics data associated with one or more prior second real-world vehicle trips made by a second real-world user. Also, the non-transitory computer-readable medium includes instructions to determine one or more second real-world driving characteristics based at least in part upon the second real-world telematics data before a second virtual character is generated. Additionally, the non-transitory computer-readable medium includes instructions to determine one or more second virtual characteristics based at least in part upon the one or more second real-world driving characteristics and generate the second virtual character associated with the one or more second virtual characteristics. After the second virtual character is generated, the non-transitory computer-readable medium includes instructions to present the second virtual character in the virtual game. The one or more first real-world driving characteristics and the one or more second real-world driving characteristics are different. The one or more first virtual characteristics and the one or more second virtual characteristics are determined to be different in response to the one or more first real-world driving characteristics and the one or more second real-world driving characteristics being different. The first virtual character and the second virtual character are generated to be different with different virtual characteristics. For example, the non-transitory computer-readable medium is implemented according to at least FIG. 1A, FIG. 1B, FIG. 3, and/or FIG. 4.

V. Examples of Machine Learning According to Certain Embodiments

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

VI. Additional Considerations According to Certain Embodiments

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for generating one or more virtual characters, the computer-implemented method comprising:
    determining, by a computing device, one or more first real-world driving characteristics comprising a first real-world focus skill based at least in part upon first real-world telematics data, wherein the first real-world focus skill comprises an ability to regain focus on operating a real-world vehicle after encountering a focus obstacle while operating the real-world vehicle;
    determining, by the computing device, one or more first virtual driving characteristics comprising a first virtual focus skill based at least in part upon the one or more first real-world driving characteristics;
    generating, by the computing device, a first virtual character associated with the one or more first virtual driving characteristics; and
    presenting, by the computing device, the first virtual character in a virtual game.

2. The computer-implemented method of claim 1, wherein the one or more first virtual driving characteristics are assigned a driving score corresponding to a level of driving competency.

3. The computer-implemented method of claim 2, wherein the driving score is associated with telematics data corresponding to the one or more first real-world driving characteristics.

4. The computer-implemented method of claim 1, wherein the one or more first virtual driving characteristics are weighted differently based on different real-world driving violations.

5. The computer-implemented method of claim 1, wherein the one or more first virtual driving characteristics comprise at least one of:
- a first virtual alertness characteristic based upon first real-world driving alertness;
- a first virtual reaction time based upon a first real-world driving reaction time;
- a first virtual risk-taking characteristic based upon first real-world driving risk-taking; or
- a first virtual endurance characteristic based upon first real-world driving endurance.

6. The computer-implemented method of claim 1, further comprising generating, by the computing device, a second virtual character associated with one or more second virtual driving characteristics based at least in part upon one or more second-real-world driving characteristics.

7. The computer-implemented method of claim 6, wherein the second virtual character and the first virtual character are presented in (i) a same virtual game or (ii) different virtual games.

8. A system comprising one or more processors and one or more non-transitory computer-readable media storing computing instructions that, when executed on the one or more processors, cause the one or more processors to perform operations comprising:
- determining, by a computing device, one or more first real-world driving characteristics comprising a first real-world focus skill based at least in part upon first real-world telematics data, wherein the first real-world focus skill comprises an ability to regain focus on operating a real-world vehicle after encountering a focus obstacle while operating the real-world vehicle;
- determining, by the computing device, one or more first virtual driving characteristics comprising a first virtual focus skill based at least in part upon the one or more first real-world driving characteristics;
- generating, by the computing device, a first virtual character associated with the one or more first virtual driving characteristics; and
- presenting, by the computing device, the first virtual character in a virtual game.

9. The system of claim 8, wherein the one or more first virtual driving characteristics are assigned a driving score corresponding to a level of driving competency.

10. The system of claim 9, wherein the driving score is associated with telematics data corresponding to the one or more first real-world driving characteristics.

11. The system of claim 8, wherein the one or more first virtual driving characteristics are weighted differently based on different real-world driving violations.

12. The system of claim 8, wherein the one or more first virtual driving characteristics comprise at least one of:
- a first virtual alertness characteristic based upon first real-world driving alertness;
- a first virtual reaction time based upon a first real-world driving reaction time;
- a first virtual risk-taking characteristic based upon first real-world driving risk-taking; or
- a first virtual endurance characteristic based upon first real-world driving endurance.

13. The system of claim 8, further comprising generating, by the computing device, a second virtual character associated with one or more second virtual driving characteristics based at least in part upon one or more second-real-world driving characteristics.

14. The system of claim 13, wherein the second virtual character and the first virtual character are presented in (i) a same virtual game or (ii) different virtual games.

15. One or more non-transitory computer-readable media storing computing instructions that, when executed by one or more processors, cause the one or more processors to perform operations comprising:
- determining, by a computing device, one or more first real-world driving characteristics comprising a first real-world focus skill based at least in part upon first real-world telematics data, wherein the first real-world focus skill comprises an ability to regain focus on operating a real-world vehicle after encountering a focus obstacle while operating the real-world vehicle;
- determining, by the computing device, one or more first virtual driving characteristics comprising a first virtual focus skill based at least in part upon the one or more first real-world driving characteristics;
- generating, by the computing device, a first virtual character associated with the one or more first virtual driving characteristics; and
- presenting, by the computing device, the first virtual character in a virtual game.

16. The one or more non-transitory computer-readable media of claim 15, wherein the one or more first virtual driving characteristics are assigned a driving score corresponding to a level of driving competency, and wherein the driving score is associated with telematics data corresponding to the one or more first real-world driving characteristics.

17. The one or more non-transitory computer-readable media of claim 15, wherein the one or more first virtual driving characteristics are weighted differently based on different real-world driving violations.

18. The one or more non-transitory computer-readable media of claim 15, wherein the one or more first virtual driving characteristics comprise at least one of:
- a first virtual alertness characteristic based upon first real-world driving alertness;
- a first virtual reaction time based upon a first real-world driving reaction time;
- a first virtual risk-taking characteristic based upon first real-world driving risk-taking; or
- a first virtual endurance characteristic based upon first real-world driving endurance.

19. The one or more non-transitory computer-readable media of claim 15, further comprising generating, by the computing device, a second virtual character associated with one or more second virtual driving characteristics based at least in part upon one or more second-real-world driving characteristics.

20. The one or more non-transitory computer-readable media of claim 19, wherein the second virtual character and the first virtual character are presented in (i) a same virtual game or (ii) different virtual games.

* * * * *